W. B. LEFLER.
DRIVING MECHANISM FOR VEHICLES.
APPLICATION FILED MAY 9, 1921.
1,418,310.
Patented June 6, 1922.
2 SHEETS—SHEET 1.
Fig. 1.
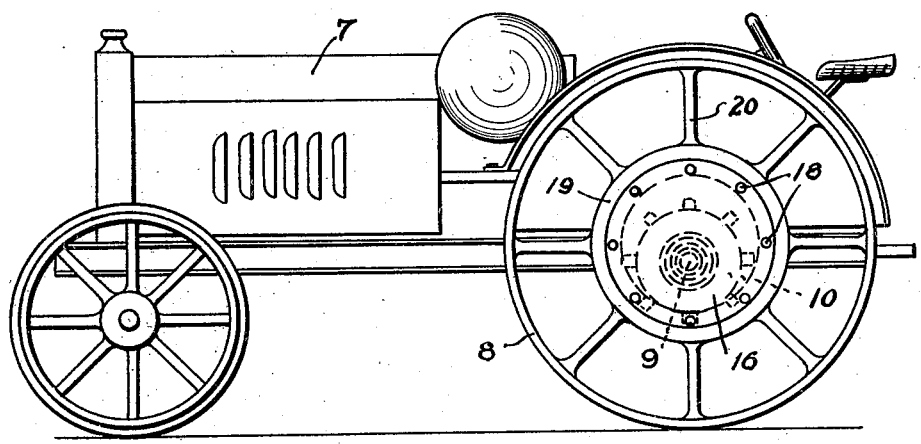
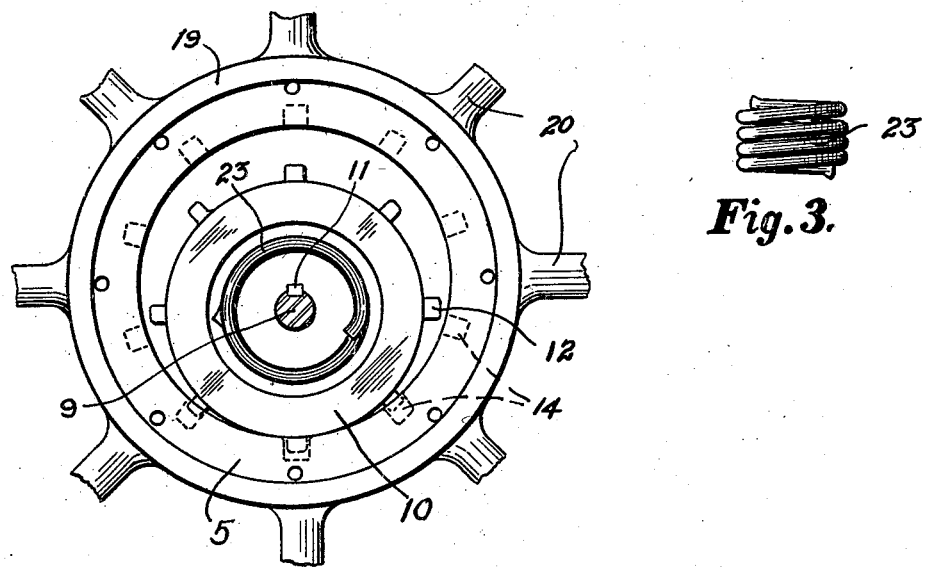
Fig. 2.
Fig. 3.
Inventor
W. B. Lefler.
By Arthur H. Sturges.
Attorney

W. B. LEFLER.
DRIVING MECHANISM FOR VEHICLES.
APPLICATION FILED MAY 9, 1921.

1,418,310.

Patented June 6, 1922.
2 SHEETS—SHEET 2.

Inventor
W. B. Lefler.

By Arthur H. Sturges.
Attorney

UNITED STATES PATENT OFFICE.

WILLIAM B. LEFLER, OF SPRINGFIELD, NEBRASKA.

DRIVING MECHANISM FOR VEHICLES.

1,418,310.  Specification of Letters Patent.  Patented June 6, 1922.

Application filed May 9, 1921. Serial No. 467,977.

*To all whom it may concern:*

Be it known that I, WILLIAM B. LEFLER, a citizen of the United States, residing at Springfield, in the county of Sarpy and State of Nebraska, have invented certain new and useful Improvements in Driving Mechanism for Vehicles, of which the following is a specification.

The present invention relates to improvements in driving mechanism for vehicles and has for an object to provide certain improvements over the subject matter of my prior application, Serial Number 405,403, filed August 23, 1920, and entitled Drive mechanism for vehicles.

The present invention aims to provide a loose connection between the driving shaft of the vehicle and the road wheel to which motion is transmitted by the use of a floating gear element within the road wheel which is driven by the drive shaft and has a tendency to step around within the wheel due to the impetus given it by the torque of the drive shaft and which consequently imposes the weight of the vehicle on the road wheel to assist in turning the same. This idea is substantially co-extensive with that referred to in my co-pending application aforesaid, but the present idea is to further provide a suitable connection between the gear element and the road wheel which will avoid any liklihood of the two getting out of mesh or driving relation when obstacles in the roadway are encountered which tend to throw the road wheel at a considerable elevation above the roadway, and which on the rebound tends to allow the wheel to drop out of driving relation with the gear wheel.

Another object of the invention is to provide a compact, simple, and inexpensive structure which is easily accessible for accomplishing the above described purposes and which may be secured to standard frames or axles without alteration.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a view in side elevation of a motor vehicle having a driving device constructed according to the present invention;

Fig. 2 is an enlarged fragmentary view of the hub of a road wheel and appurtenant parts with one of the plates removed;

Fig. 3 is an edge view of one of the coil springs employed.

Figure 4:
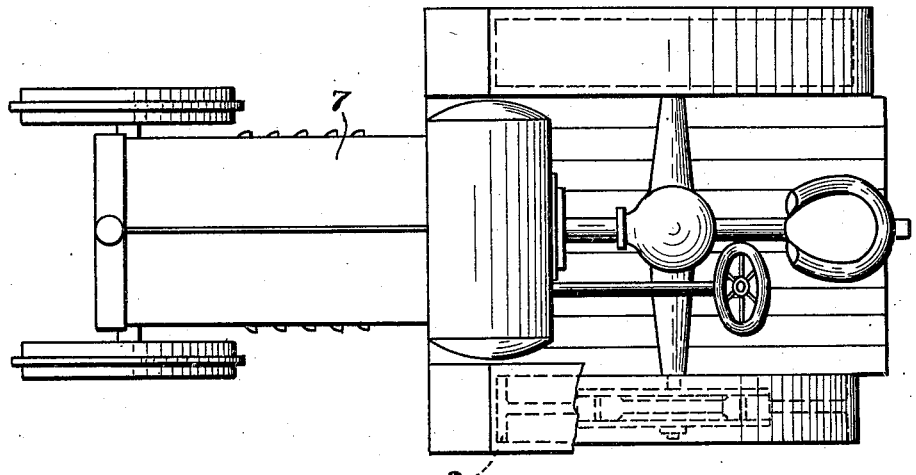
Fig. 4 is a top plan view of the tractor or other vehicle, as shown in Fig. 1.

Referring more particularly to the drawings, 7 designates generally a tractor of any suitable character having the rear drive wheels 8 and a drive shaft 9 which is rotated by the tractor engine in the usual manner.

According to the present invention I provide a gear wheel or other gear element 10 and affix it as by a key 11 shown in Fig. 2 to the drive shaft 9 so that it at all times rotates therewith and is intended to transmit rotary movement to the drive wheel 8. This gear wheel 10 is provided with peripheral teeth 12 in any suitable number and is mounted within a cavity 13 of greater diameter than the gear wheel 10 with the result that such gear wheel may float about within the cavity, but, due to the weight imposed by the vehicle parts through the axle 9 thereon, it will normally lie as represented in Fig. 2 at the bottom of such cavity.

In the inner wall of the cavity are made depressions 14 at suitably spaced intervals to agree with the distances between the teeth 12. These teeth and depressions form the driving connection between the gear wheel and the road wheel. At opposite sides of the depression 13 the wheel is formed with grooves 15 in which are received plates 16 of preferably a disc form for the purpose of closing the cavity 13 at opposite sides to exclude dust and other foreign matter from the parts therein. The plates 16 are provided with openings 17 of greater diameter than the drive shaft 9 which extends therethrough for the purpose of permitting a relative movement between the drive shaft and the plates. Bolts or other suitable fastenings 18 are employed to hold the plates 16 on the the wheel.

Figure 5:
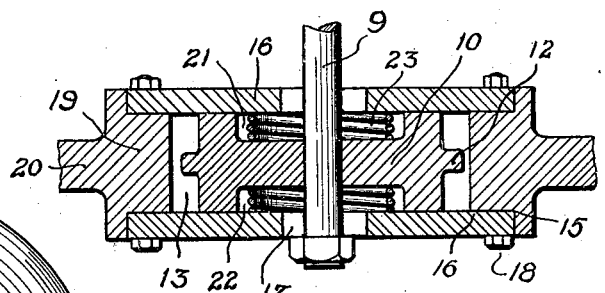
Fig. 5 is a horizontal sectional view taken through the wheel and driving parts.

At 19 is shown the hub of the wheel in which the cavity 13 is made, and the spokes of the wheel are represented at 20, it being understood of course that this wheel may be a disc wheel, a wire wheel, or the usual artillery wheel. In opposite faces of the gear wheel 10 are made recesses 21 and 22 which open out against the plates 16 and are adapted to receive coil springs 23 of the character shown in Fig. 3. These coil springs are the usual helices of suitable resilient metal coiled in a desired number of convolutions so as to fit about the drive shaft 9 without interference therewith. These coil springs are of a diameter to loosely fit about the drive shaft and also preferably of a greater diameter as compared with the opening 17 in the plate 16 to permit the ends of the coil springs to take against imperforate portions of the plate 16 and at their inner ends against the side walls of the central web of the gear wheel 10. As shown in Fig. 5, the coil springs 23 are under compression when in the recesses 21 and 22 so that they exert a considerable frictional effort between the gear wheel 10 and the road wheel 8.

Figure 6:
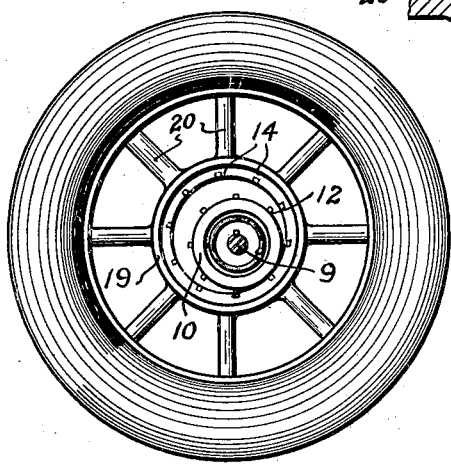
Fig. 6 is a view in side elevation of a wheel showing the driving connection stepped slightly around in the cavity.

In use, power from the engine is applied to turn the drive shaft 9 and the gear wheel 10 will, of course, be compelled to rotate therewith due to the key 11. The gear teeth 12 meshing with the depressions 14 will thus communicate this turning movement to the road wheel and the vehicle will be propelled. Normally, when the vehicle is at rest, the weight of the vehicle acting through the drive shaft 9 will always cause the gear wheel 10 to descend to the lowermost part of the depression 13, for instance, to the position shown in Fig. 2. However, when torque or turning power is applied to the shaft 9 the gear wheel 10 will tend to step around within the cavity and will attempt to climb up therewithin as represented in this Fig. 6. This is caused by the inertia of the road wheel and its resistance to turning especially at the initial movement of the vehicle. In this way the drive shaft 9 is shifted above its normal center and forwardly of the center of the road wheel, and consequently it imposes the weight of the vehicle upon this point in the road wheel which results in a tendency of the weight of the vehicle to rotate the road wheel. This occurs with every application of greater power, and it will be found very efficient in developing torque on the road wheel in stalled positions of the vehicle.

Now when the road wheel encounters obstacles or inequalities in the roadway which cause it to be thrown above the surface of the roadway, as soon as the upward force is spent and the rebound begins to take place, the road wheel will tend to descend with respect to the gear wheel 10 which would cause the teeth 12 to come out of mesh with the depressions 14. This is objectionable inasmuch as the gear wheel 10 would then be free to rotate at a very rapid speed and when the parts readjust themselves the teeth 12 would probably be stripped from the gear wheel. To avoid this the coil springs 23 at all times exert an expansion effect against the side plate 16 and prevent that relative radial movement of the road wheel which would shift the teeth 12 out of the depressions 14. These coil springs however do not interfere with the climbing or stepping movement of the gear wheel within the cavity 13 to any material extent, but they avoid at all times disengagement of teeth 12 from depressions 14.

It will be appreciated from the foregoing that I have provided an exceedingly compact structure in which simplicity of parts and inexpensiveness of materials, and workmanship are taken into account so that the resulting structure has a high commercial use.

I do not wish to be restricted to the size, form, and proportions of the various parts, and obviously changes could be made in the construction herein described without departing from the spirit of the invention, it being only necessary that such changes fall within the scope of the appended claims.

What is claimed is:

1. In combination with a vehicle having a road wheel provided with a central cavity with driving depressions therein, a gear wheel floating about in said cavity being of less diameter than the cavity and provided with teeth fitting in said depressions at the lower portion of the cavity, said gear wheel having recessed sides, plates secured to the sides of said road wheel to close the cavity and provided with large openings therein, coil springs seated in the recesses in the sides of said gear wheel and bearing frictionally against said plates, and a drive shaft extending loosely through the opening in said plates and fixed to said gear wheel.

2. In combination with a vehicle having a road wheel provided with a central enlarged cavity, a relatively small wheel floating about in said cavity and being of lesser diameter than the cavity and adapted to turn in contact with the inner wall of the cavity, said inner wall of the cavity and relatively small wheel having complemental teeth and depressions, said gear wheel having recessed sides, plates at the sides of the road wheel to enclose the cavity, coil springs seated in the recesses in the sides of the gear wheel and bearing frictionally against said plates, and a drive shaft extending loosely through the plates and fixed to said relatively small wheel.

In testimony whereof, I have affixed my signature in presence of two witnesses.

WILLIAM B. LEFLER.

Witnesses:
ARTHUR H. STURGES,
HIRAM A. STURGES.